(12) United States Patent
Vau

(10) Patent No.: US 8,027,816 B2
(45) Date of Patent: Sep. 27, 2011

(54) FREQUENCY RESPONSE OPTIMISATION OF A MOVEMENT SIMULATOR BY ADAPTIVE SINUSOIDAL REFERENCE TRACKING

(75) Inventor: Bernard Vau, Rueil-Malmaison (FR)

(73) Assignee: Ixmotion, Marly le Roi (FR)

( * ) Notice: Subject to any disclaimer, the term of this patent is extended or adjusted under 35 U.S.C. 154(b) by 666 days.

(21) Appl. No.: 12/017,559

(22) Filed: Jan. 22, 2008

(65) Prior Publication Data

US 2008/0262806 A1    Oct. 23, 2008

(30) Foreign Application Priority Data

Jan. 22, 2007   (FR) ...................................... 07 52807

(51) Int. Cl.
G06F 7/60       (2006.01)
G06F 17/10      (2006.01)
(52) U.S. Cl. .......................................................... 703/2
(58) Field of Classification Search ........................ 703/2
See application file for complete search history.

(56) References Cited

U.S. PATENT DOCUMENTS

| | | | | |
|---|---|---|---|---|
| 5,124,626 A | * | 6/1992 | Thoen | 318/610 |
| 2006/0284588 A1 | * | 12/2006 | Vau | 318/677 |

OTHER PUBLICATIONS

Ole Ravn, "On-line System Identification and Adaptive Control using The Adaptive Blockset", 1999.*
Yee-Pien Yang, Zhao-Wei Liu, and Fu-Cheng Wang, "Model Reference Adaptive Control of a Low Power Proton Exchange Membrane Fuel Cell", Proceedings of the 46th IEEE Conference on Decision and Control, Dec. 12-14, 2007.*
Hynek Prochazka, "User's Guide for Pole Placement Master Matlab(R), graphical toolbox for robust digital controller design", Jun. 2003.*
Bernard Widrow and Gregory Plett, "Nonlinear Adaptive Inverse Control", Proceeding of the 36th Conference on Decision and Control, Dec. 1997.*

* cited by examiner

*Primary Examiner* — David Silver
*Assistant Examiner* — Angel Calle
(74) *Attorney, Agent, or Firm* — Young & Thompson

(57) ABSTRACT

The control device of a movement simulator, between its input formed of a control signal and its output formed of a measured magnitude among its speed, its position and its acceleration, by a transfer function $B(z^{-1})/A(z^{-1})$ includes a corrector synthesized from the modelling of the movement simulator and equivalent to a RST controller. The controller includes a reference input, a retro-action input whereon is applied the measured magnitude and an output producing the control signal. The transfer function between the reference input of the controller and the measured magnitude is $H(z^{-1})/W(z^{-1})$. The device has a reference filter whose input is a sinusoidal reference signal c(t) at a frequency wc and applying at output a filtered reference signal on the reference input of the controller. The reference filter has a transfer function $Rr(z^{-1})/Fr(z^{-1})$, whose denominator and numerator are adapted to ensure, for the frequency wc, effective tracking by the movement simulator of the sinusoidal reference.

18 Claims, 2 Drawing Sheets

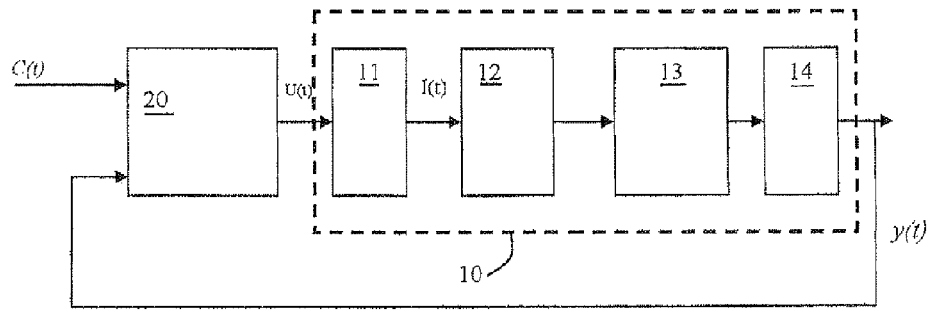
Fig. 1       Prior Art
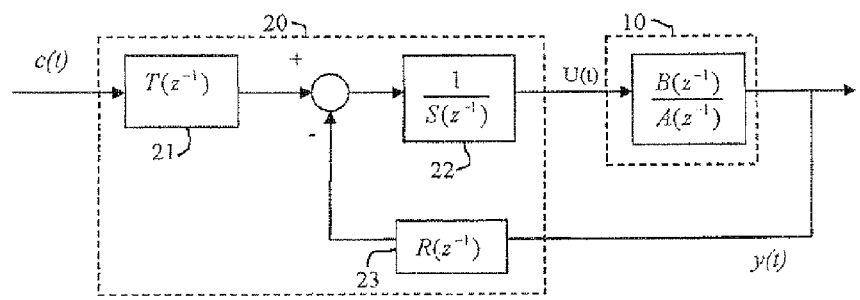
Fig. 2       Prior Art
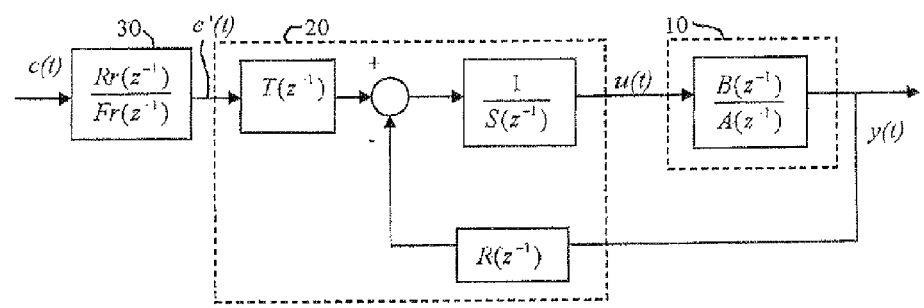
Fig. 3

FREQUENCY RESPONSE OPTIMISATION OF A MOVEMENT SIMULATOR BY ADAPTIVE SINUSOIDAL REFERENCE TRACKING

CROSS-REFERENCE TO RELATED APPLICATIONS

The instant Application claims benefit of priority and incorporates by reference French Application 0752807 filed Jan. 22, 2007.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable

BACKGROUND OF THE INVENTION

1. Field of the Invention

The invention relates to movement simulators controlled in position, in speed or in acceleration.

2. Description of Related Art

The movement simulators are used, among other things, for testing the frequency response of a component laid on the table top of a movement simulator capable of generating movements such as instantaneous rotational movements around an axis. A particularly interesting category of movements for conducting tests is formed of movements such as the position, the speed or the angular acceleration of the axis is a sinusoidal function characterised by an amplitude and a frequency. A reference signal of the form $Ae^{j \cdot w \cdot t}$ is hence applied while adopting a complex notation) and the characteristic measurements are performed on the sensor to be tested. But this test is only valid if the movement simulator has effectively a movement which follows the reference signal. Consequently the actual movement of the movement simulator should be as close as possible with respect to the reference. Incidentally, the word component defines here any inertial component or any type of sensor measuring a position, a speed or an acceleration.

Control systems for movement simulator are already known by the patent application WO2006/131664A or the article <<Implementation of RST controllers for a flexible servo considering practical limitations>> by CHAMPENOIS G. and AP. in Industrial Automation and Control, 1995, p. 209-213 ISBN 0-7803-2081-6.

The structure of the control loop in position (in speed or in acceleration) of a movement simulator is generally complying with the diagram represented on FIG. 1. The physical system to be controlled 10 is formed of a current amplifier 11, of a direct current or alternating current motor 12 (for instance a brushless alternating current motor: <<AC brushless>>), of the axis 13 of the machine and of a sensor 14. The current amplifier 11 receives for instance a signal in the form of a voltage u(t) and applies consequently the intensity i(t) corresponding at the terminals of the electric motor 12. The axis 13 of the movement simulator coupled to the rotor of the electric motor 11, the circulation of a current i(t) adapted in the stator sets in rotation the axis 13 around its axis of symmetry. The sensor 14 measures an instantaneous kinematic magnitude y(t) relative to the movement of the axis 13 of the movement simulator. This measured magnitude y(t) may be either the position of the axis or the speed thereof, or still the acceleration thereof (angular or linear measured magnitude).

The control loop consists of a control law 20 which, from the inputs formed simultaneously of the reference signal c(t) and of the measured magnitude y(t), determines the value of the signal u(t) to apply to the controlled system 10. This command law is established by a synthesis algorithm from a physical modelling of the behaviour of the system to be controlled.

The closed loop presented on FIG. 1 has the particularity of exhibiting a "low-pass" behaviour between the reference c(t) and the measurement y(t). Which means that the quality of the tracking of a sinusoidal reference depends on the frequency of this reference. For the low frequencies (for instance of the order of the Hertz), there is no particular difficulty for ensuring a tracking of the reference without the occurrence of a significant error, so called the tracking error, between the reference c(t) and the measured magnitude y(t), for instance the position. Conversely, the more the frequency of the sinusoidal reference increases, the more the tracking error becomes significant. For these high frequencies, the position of the axis stills follows a sinusoidal movement but with a certain attenuation of the amplitude which is increasingly marked as the frequency rises. The cut-off frequency of the control loop is defined as the frequency for which the amplitude of the reference undergoes a ±3 dB attenuation.

It is desirable that the cut-off frequency, which is an indicator of the performances of the control loop, is as high as possible. Nevertheless the maximal value of the cut-off frequency is limited because of the high frequency dynamics which cannot be taken into account in the modelling of the controlled machine, a modelling on which the synthesis of the control law is based. These high frequency dynamics on the modelling are for instance due to the electric dynamics of the motor or, still, the resonances of the mechanical structure.

Besides, so that the control loop is stable regardless of the movement one wished to impart to the movement simulator, a so-called robust controller should be designed relative to these high frequency dynamics. As a reminder, the robustness property of a control loop guarantees the stability of the control loop when the system to be controlled departs from the rated model. However, from a theoretical viewpoint, robustness and performances are proved to be two antagonistic notions. I.e. the robustness necessary in the control loop provides limitations for the performances of this control law, and in particular lowers the cut-off frequency of this control law. All the known control systems used on the current movement simulators are subject to such constraint.

Moreover, it should be added that the sinusoidal movement of the axis is not only attenuated relative to the reference signal but also phase-shifted relative thereto. This phase-shift rises significantly when the frequency increases. The phase-shift starts to be significant at frequencies much lower than the cut-off frequency of the slaving.

The movement simulators being machines designed for metrology, this attenuation and this phase-shift cause great difficulties for accurate characterisation of the components to be tested.

The purpose of the invention is hence to remedy the shortcomings aforementioned while suppressing or at least while reducing highly any attenuation and any phase-shift of the measured magnitude (position, speed or acceleration) relative to the sinusoidal reference.

BRIEF SUMMARY OF THE INVENTION

To do so the invention relates to a control device of a movement simulator, said movement simulator being modelled, between its input formed of a control signal u(t) and its output formed of a measured magnitude y(t) (position, speed or acceleration of the axis), by a transfer function $B(z^{-1})/A(z^{-1})$, said control device including a synthesised corrector from said modelling of the movement simulator and equivalent to a RST corrector, the corrector comprising a reference input, a retro-action input whereon is applied said measured magnitude y(t) and an output producing said control signal u(t), the transfer function between the reference input of the corrector and the measured magnitude then being $H(z^{-1})/W(z^{-1})$. According to the invention the retro-action device is characterised in that it comprises a reference filter taking at input a sinusoidal reference signal c(t) having a pulse wc and applying at output a filtered reference signal c'(t) on the reference input of said corrector (20); said reference filter having a transfer function $Rr(z^{-1})/Fr(z^{-1})$ whereof the denominator $Fr(z^{-1})$ and the numerator $Rr(z^{-1})$ are determined so as to ensure, for the pulse wc, effective tracking by the movement simulator of the sinusoidal reference.

In an embodiment the numerator $Rr(z^{-1})$ of the transfer function is such as the expression $Fr(z^{-1})W(z^{-1}) - Rr(z^{-1})H(z^{-1})$ is factorised in the form $$D(z^{-1})Lo(z^{-1}) = [1 - 2\cos(wc \cdot Te) \cdot z^{-1} + z^{-2}]Lo(z^{-1});$$

and in that said numerator $Rr(z^{-1})$ of the transfer function is the solution of a so-called Bezout equation:

$$D(z^{-1})Lo(z^{-1}) + Rr(z^{-1})H(z^{-1}) = Fr(z^{-1})W(z^{-1})$$

for the pulse wc of the reference signal.

Preferably, the device includes a means to determine $Rr(z^{-1})$ capable of solving on line the Bezout equation according to the parameter formed by the pulse wc of said reference signal, so that said control device enables adaptive tracking of said sinusoidal reference.

According to another embodiment, the device includes:
a means for simulating the assembly formed by the controller and by the physical system, producing an ideal measured magnitude ym(t) and having as a transfer function $H(z^{-1})/W(z^{-1})$;
a means for estimating the residual attenuation and phase-shift capable, from the actual measured magnitude y(t) and the ideal measured magnitude ym(t), to determine the values of the residual attenuation At and of the residual phase-shift φ, between the actual movement of the movement simulator and the ideal measured magnitude ym(t);
a means to determine $Rr(z^{-1})$ capable of calculating, to the pulse wc of the reference signal, said numerator $Rr(z^{-1})$ of the transfer function of the reference filter, in relation to the residual attenuation and phase-shift determined by said estimating means, by on-line resolution of the system of equations:

$$\frac{H(1)}{W(1)} \cdot \frac{Rr(1)}{Fr(1)} = 1$$

$$\frac{H(e^{-jwcTe})}{W(e^{-jwcTe})} \cdot \frac{Rr(e^{-jwcTe})}{Fr(e^{-jwcTe})} = \frac{1}{At}e^{-j\varphi}$$

Preferably, the estimating means of the residual attenuation and phase-shift is based on a recursive identification algorithm, for instance a least square algorithm.

Preferably still, the means to determine $Rr(z^{-1})$ also takes as an input parameter the value of the frequency of said reference signal, so that said control device exhibits the function of adaptive tracking of the sinusoidal reference.

Advantageously, the device includes a means for estimating the frequency capable of determining the value of the frequency of the reference applied at input of said reference filter.

Preferably, the estimating means of the frequency is based on a recursive identification algorithm, for instance an extended least square algorithm.

The invention also relates to a control device of a movement simulator, the movement simulator being modelled, between its input formed of a control signal u(t) and its output formed of a measured magnitude y(t) among its position, its speed and its acceleration, by a transfer function $B(z^{-1})/A(z^{-1})$, said control device including a synthesised corrector from said modelling of the movement simulator and equivalent to a RST corrector, said corrector comprising a reference input, a retro-action input whereon is applied said measured magnitude y(t) and an output producing said control signal u(t), the transfer function between the reference input of the controller and the measured magnitude then being $H(z^{-1})/W(z^{-1})$; characterised in that a sinusoidal reference signal is filtered having a frequency wc for applying a filtered reference signal c'(t) on the reference input of said controller; the filtering step of the reference signal taking place so as to ensure effective tracking by the movement simulator of the sinusoidal reference.

According to an embodiment the filtering is provided according to a transfer function $Rr(z^{-1})/Fr(z^{-1})$ whereof the numerator $Rr(z^{-1})$ is determined so that the expression $Fr(z^{-1})W(z^{-1}) - Rr(z^{-1})H(z^{-1})$ is factorised in the form:

$$D(z^{-1})Lo(z^{-1}) = [1 - 2\cos(wc \cdot Te) \cdot z^{-1} + z^{-2}]Lo(z^{-1})$$

The numerator $Rr(z^{-1})$ is determined as a solution of a so-called Bezout equation:

$$D(z^{-1})Lo(z^{-1}) + Rr(z^{-1})H(z^{-1}) = Fr(z^{-1})W(z^{-1})$$

to the frequency wc of the reference signal.

Preferably, $Rr(z^{-1})$ is determined on line while solving on line said Bezout equation according to the parameter formed by the frequency wc of said reference signal, so that said slaving device enables adaptive tracking of said sinusoidal reference.

According to another embodiment:
the behaviour of the assembly formed by the controller and by the movement simulator is simulated by means of a transfer function $H(z^{-1})/W(z^{-1})$ so as to provide an ideal measured magnitude ym(t);
the residual attenuation and the residual phase-shift between the actual movement of the movement simulator and the ideal measured magnitude ym(t) is estimated from the actual measured magnitude y(t) and the ideal measured magnitude ym(t);
said numerator $Rr(z^{-1})$ is determined in relation to the frequency wc, of the residual attenuation and phase-shift determined in the estimating step, by on-line resolution of the system of equations:

$$\frac{H(1)}{W(1)} \cdot \frac{Rr(1)}{Fr(1)} = 1$$

$$\frac{H(e^{-jwcTe})}{W(e^{-jwcTe})} \cdot \frac{Rr(e^{-jwcTe})}{Fr(e^{-jwcTe})} = \frac{1}{At}e^{-j\varphi}$$

the filtering of the reference is adapted with the determined value of $Rr(z^{-1})$.

Preferably the estimating means of the residual attenuation and phase-shift is based on a recursive identification algorithm, for instance a least square algorithm.

Preferably still the means to determine the numerator $Rr(z^{-1})$ also takes as an input parameter the value of the frequency of said reference signal, so that the control device ensures an adaptive tracking for the instantaneous value of the sinusoidal reference.

Advantageously, the method comprises an initial step for estimating the frequency of said reference signal.

Preferably, the estimating means of the frequency is based on a recursive identification algorithm, for instance an extended least square algorithm.

The invention also relates to a computer program comprising a series of instructions capable of being loaded into the memory of a computer and of being performed by the calculator of said computer. The program according to the invention enables to implement the control method according to the invention.

BRIEF DESCRIPTION OF THE SEVERAL VIEWS OF THE DRAWINGS

The invention will be understood better and other aims, details, features and advantages thereof will appear more clearly in the description of a particular embodiment of the invention given solely by way of example and without being limited thereto with reference to the appended drawing. On these drawings:

FIG. 1 represents from a general viewpoint a closed loop of the state of the art;

FIG. 2 is a diagrammatic representation in the form of functional blocks of the control loop of FIG. 1;

FIG. 3 is a diagrammatic representation of implementation of a reference filter for a given reference signal;

DETAILED DESCRIPTION OF THE INVENTION

Figure 4:
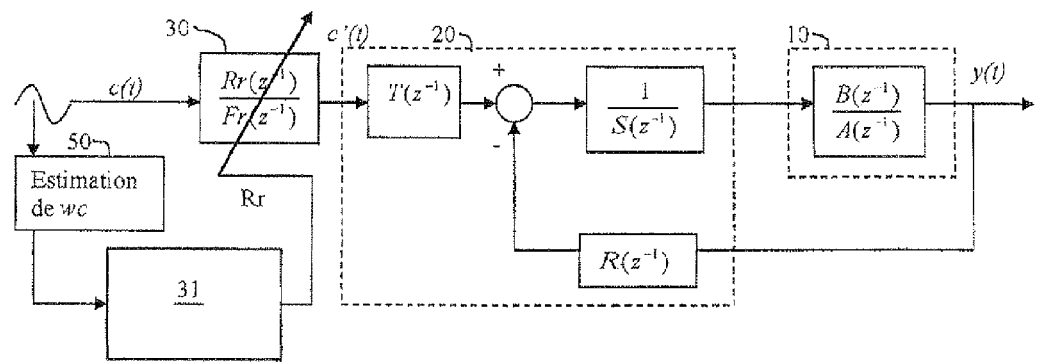
FIG. 4 is a diagrammatic representation according to an embodiment of the invention enabling to track the reference signal and which picks up essentially FIG. 3 while adding on line resolution blocks of the Bezout equation; and, FIG. 5 is a diagrammatic representation in the form of functional blocks of a second embodiment of the invention enabling the suppression of residual attenuations and phase-shifts.

The block diagram of a closed loop is given very generally by FIG. 2. The system 10 to be controlled is modelled by a discrete transfer function G, sampled with the period Te:

$$G(z^{-1}) = \frac{B(z^{-1})}{A(z^{-1})} \quad (1)$$

In the equation (1), $z = e^{j \cdot w \cdot Te}$ represents the "advance of a sampling period" operator.

The corrector or command law 20 is represented as an RST forms (corrector with two degrees of freedom), which is the most general representation of a monovariable corrector. It can be seen that any linear monovariable corrector may be as an RST form. In particular the correctors of the PID type, monovariable LQG-LTR, Hinfini, Crone, etc. may be written as an RST form. The present invention is hence not limited to the RST correctors. The structure of the RST controller is represented diagrammatically in detail on FIG. 2 by the blocks 21 to 23.

The transfer function between the reference c(t) and the measurement y(t) is written as follows:

$$\frac{y(t)}{c(t)} = \frac{T(z^{-1})B(z^{-1})}{A(z^{-1})S(z^{-1}) + B(z^{-1})R(z^{-1})} = \frac{H(z^{-1})}{W(z^{-1})} \quad (2)$$

This transfer function is of the "low-pass" type as was indicated in the introduction, i.e. the attenuation and the phase-shift of the measurement relative to the reference increase when the frequency of this reference increases.

The implementation of a reference filter will now be described in detail relative to FIG. 3, for which the frequency of the sinusoidal reference is known.

In a first step, the modelling of the system to be controlled is supposedly performed perfectly by the transfer function of the equation (1). I.e. the measurement y(t) of the actual system to be controlled behaves, for the same input, exactly as the output value of the transfer function of the equation (1).

According to the invention, for ensuring tracking of the sinusoidal reference c(t) without any tracking error, the frequency we (rad/s) of this reference being known, a reference filter 30 is added upstream of the corrector 20 as represented on FIG. 3. The input of filter 30 is c(t). This filter 30 generates a filtered reference c'(t) which is applied as a reference input of the corrector 20. The reference filter 30 has a transfer function which is written as follows:

$$\frac{Rr(z^{-1})}{Fr(z^{-1})} \quad (3)$$

The whole closed loop has then as a transfer function the equation:

$$\frac{y(t)}{c(t)} = \frac{Rr(z^{-1})}{Fr(z^{-1})} \cdot \frac{H(z^{-1})}{W(z^{-1})} \quad (4)$$

The purpose is then to adapt la transfer function of the filter 30 for ensuring tracking of the reference.

A way of proceeding consists in defining the error of reference tracking by e(t)=c(t)−y(t). From the equation (4) is obtained:

$$e(t) = \quad (5)$$
$$c(t) \cdot \left[1 - \frac{Rr(z^{-1})H(z^{-1})}{Fr(z^{-1})W(z^{-1})}\right] = c(t) \cdot \left[\frac{Fr(z^{-1})W(z^{-1}) - Rr(z^{-1})H(z^{-1})}{Fr(z^{-1})W(z^{-1})}\right]$$

It appears that the follow-up reference takes place without any tracking error when the numerator $Fr(z^{-1})W(z^{-1})-Rr(z^{-1})H(z^{-1})$ of the equation (5) is factorised in the form:

$$Fr(z^{-1})W(z^{-1})-Rr(z^{-1})H(z^{-1})=D(z^{-1})Lo(z^{-1})=[1-2\cos(wc \cdot Te) \cdot z^{-1}+z^{-2}]Lo(z^{-1})$$

$Fr(z^{-1})$ being the denominator of the reference filter 30, it may be selected arbitrarily providing it is a degree 2 stable polynomial. Both unknown values of the problem are then only the polynomials $Rr(z^{-1})$ and $Lo(z^{-1})$ which may be obtained by the resolution of the equation:

$$D(z^{-1})Lo(z^{-1})+Rr(z^{-1})H(z^{-1})=Fr(z^{-1})W(z^{-1}) \quad (6)$$

The equation (6) is a so-called Bezout polynomial equation, whereof the resolution is conventional in mathematics.

Generally, it is also desirable that the tracking of static references is ensured. Also the following is taken as polynomial D:

$$D(z^{-1})=(1-z^{-1})\cdot(1-2\cos(wc\cdot Te)\cdot z^{-1}+z^{-2}) \quad (7)$$

In such a case $Fr(z^{-1})$ must be a stable polynomial of order 3.

It should be noted that everything which has been developed is only valid for sinusoidal references having a given frequency we (rad/s).

The embodiment of the invention now described enables reference tracking regardless of the frequency wc of the sinusoidal reference applied. To do so, the reference filter is modified so as to present an adaptive character in relation to the frequency of the sinusoidal reference applied effectively. To do so, the Bezout equation (6) is solved on line by the algorithm represented schematically by the block 31 (cf. FIG. 4). The resolution of the equation (6) is conducted according to the parameter formed by the frequency wc of the reference.

Besides, the reference c(t) of position, of speed or acceleration may be either an external reference generated by the user of the movement simulator, by means for instance of a frequency generator, or an internal reference. In the latter case, it is then a reference internal to the calculator of the movement simulator which is generated by a specific algorithm. Whereas in the second case the frequency is known and may be applied easily at input to the means to determine $Rr(z^{-1})$, in the first case the reference frequency is not known.

For the case of an unknown frequency, this frequency should then be determined by estimating it by means of a specific algorithm. It is this algorithm, represented schematically by the functional block 50 on FIG. 4, which will now be described.

Let there be s(t) a sinusoidal reference signal centred at 0, sampled with the period Te and of frequency wc (in rad/s). For such a signal, there exists a recursive equation enabling to link s(t+1) to s(t) and s(t−1). It shows that this recursive equation is in the form:

$$s(t+1)=2\cdot\cos(wc\cdot Te)\cdot s(t)-s(t-1) \quad (8)$$

The, while defining:

$$Ys(t+1)=s(t+1)+s(t-1)$$

$$Us(t)=s(t) \quad (9)$$

The following may be written:

$$Ys(t+1)=2\cdot\cos(wc\cdot Te)\cdot Us(t) \quad (10)$$

Let there be:

$$Ys(t+1)=\Theta_s\cdot Us(t) \quad (11)$$

In the general case, s(t) may be an analogue reference with a noise eb(t) which is here supposedly a white noise. The following is then obtained:

$$Ys(t+1)=s(t+1)+s(t-1)+eb(t+1)+eb(t-1)$$

$$Us(t)=s(t)+eb(t) \quad (12)$$

Taking (20) into account, the following may be written:

$$Ys(t+1)=\Theta_s\cdot Us(t)+eb(t+1)-\Theta_s\cdot eb(t)+eb(t-1) \quad (13)$$

In order to identify $\Theta_s$ without any bias the following for instance may be used, among other possible algorithms, the algorithm of the recursive extended least squares with:

$$\Phi(t)^T=[U(t)\ \epsilon(t)\ \epsilon(t-1)]$$

$$\hat{\Theta}(t)=[\hat{\Theta}_s\ \hat{c}_1\ \hat{c}_2] \quad (14)$$

The parametric adaptation algorithm is written as follows:

$$\hat{\Theta}(t+1)=\hat{\Theta}(t)+F(t)\cdot\Phi(t)\cdot\varepsilon(t+1) \quad (15)$$

$$F(t+1)^{-1}=\lambda_1\cdot F(t)^{-1}+\lambda_2\cdot\Phi(t)\cdot\Phi(t)^t$$

$$\varepsilon(t+1)=\frac{y(t+1)-\hat{\Theta}(t)^T\cdot\Phi(t)}{1+\Phi^T(t)\cdot F(t)\cdot\Phi(t)} \quad (16)$$

Where F is a 3×3 matrix initialised with the following 3×3 matrix:

$$F(0)=1000\cdot\begin{bmatrix}1 & 0 & 0\\ 0 & 1 & 0\\ 0 & 0 & 1\end{bmatrix}$$

For more information about this algorithm, it may be referred to the opus of Ioan Doré Landau "Identification des systèmes" (Ed Hermes 2001).

In the system of equations (16), the variables $\lambda_1,\lambda_2$ are scalars and are called forgetting factors. The conditions $0<\lambda_1\leq 1$ and $0\leq\lambda_2<2$ should be obtained. $\lambda_1$ may for instance be selected as ranging between 0.95 and 0.99 and $\lambda_2$ equal to the unit.

The control method according to the embodiment of the invention described previously enables to improve significantly tracking of the sinusoidal references with respect to the control processes known. However this method is imperfect since the transfer function of the system to be controlled $B(z^{-1})/A(z^{-1})$ is only a modelling and hence an approximation of the actual physical system to be controlled. The differences in behaviour between the model and the actual system are increasingly high when the increasing frequencies are considered. A last embodiment of the invention enabling perfect tracking of the reference will now be described in detail with reference to FIG. 5.

While restraining the process to a linear approach, the true transfer function of the actual system is noted $\tilde{B}(z^{-1})/\tilde{A}(z^{-1})$ and its coefficients are unknown. This transfer function is anyway of higher order than the transfer function of the model: $B(z^{-1})/A(z^{-1})$.

Consequently, the transfer function $H(z^{-1})/W(z^{-1})$ used above is only an approximation of the corresponding actual transfer function $\tilde{H}(z^{-1})/\tilde{W}(z^{-1})$, which is also unknown. The divergences between both these transfer functions increase with frequency.

The Bezout equation (6) described above being solved from $H(z^{-1})$ and $W(z^{-1})$ the calculated expression of $Rr(z^{-1})$ does not enable perfect follow-up of a sinusoidal reference, and this essentially at the frequencies where there is a divergence between $H(z^{-1})/W(z^{-1})$ and $\tilde{H}(z^{-1})/\tilde{W}(z^{-1})$, i.e. at high frequencies where appear again an attenuation and a phase-shift that will be qualified as residual attenuation and phase-shift.

The method according to the third embodiment of the invention consists, in parallel to the control loop of the actual system characterised by the function $\tilde{H}(z^{-1})/\tilde{W}(z^{-1})$, in simulating the ideal regulation loop founded on the modelling of the physical system and characterised by the function $H(z^{-1})/W(z^{-1})$. The actual measured magnitude y(t) whereas the measured magnitude simulated is ym(t).

Figure 5:
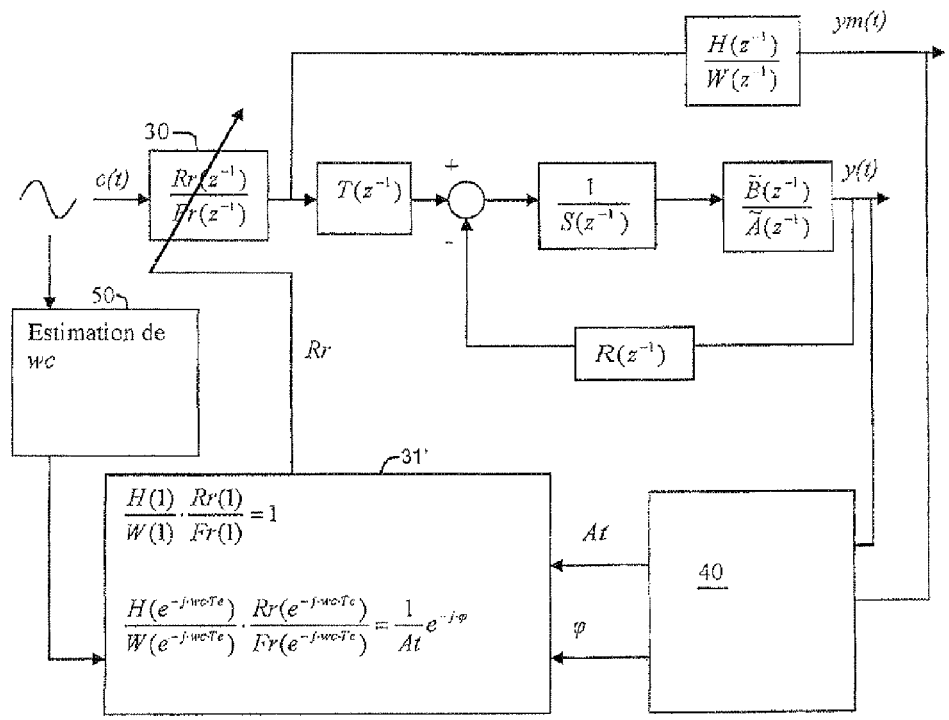

By means of a recursive algorithm represented schematically by the block 40 of FIG. 5, the attenuation and the phase-shift are identified on line between the actual loop and the simulated loop. At and ϕ are respectively the residual attenuation and the residual phase-shift between the model of the ideal closed loop and the actual closed loop.

The recursive identification algorithm is based on the principle that, for sinusoidal signals centred at 0, y(t) may be expressed in relation to ym(t) from the following relation:

$$y(t) = (\alpha + \beta \cdot z^{-1}) \cdot ym(t) \tag{17}$$

It should be noted that if the sinewave signal is not centred at 0, the continuous component is eliminated by means of a high-pass filter.

Taking into account that $z^{-1} = e^{-j \cdot w \cdot Te}$ and that the frequency of the sinusoidal signals is known and is equal to wc, the following may be written:

$$y(t) = (\alpha + \beta \cdot e^{-j \cdot wc \cdot Te}) \cdot ym(t)$$

$$y(t) = \alpha + (\beta \cdot \cos(-wc \cdot Te)) + j \cdot \beta \cdot \sin(-wc \cdot Te)$$

$$y(t) = At \cdot e^{j \cdot \phi}$$

One has consequently:

$$At = \sqrt{(\alpha + \beta \cdot \cos(-wc \cdot Te))^2 + \beta^2 \cdot \sin^2(-wc \cdot Te)} \tag{18}$$

$$\varphi = \arctan\left(\frac{\beta \cdot \sin(-wc \cdot Te)}{\alpha + \beta \cdot \cos(-wc \cdot Te)}\right)$$

Thus, to estimate At and ϕ, it suffices to identify on line recursively α and β. The recursive identification methods are numerous and the recursive least square method may be taken for instance.

This method will now be explained, but, for more detail, it may be referred to the opus of Ioan Doré Landau "Identification des systèmes" (Ed Hermes 2001).

While adopting a matrix notation, $\Theta^T = [\alpha\ \beta]$ defines the parameters of the model to be identified, $\Phi(t)^T = [ym(t)\ ym(t-1)]$ the vector of the observations, and $\hat{\Theta}^T(t) = [\hat{\alpha}(t)\ \hat{\beta}(t)]$ estimate of $\Theta^T$ at the instant t. The algorithm of the recursive extended least squares is then written as follows:

$$\hat{\Theta}(t+1) = \hat{\Theta}(t) + F(t) \cdot \Phi(t) \cdot \varepsilon(t+1) \tag{19}$$

And we obtain:

$$F(t+1)^{-1} = \lambda_1 \cdot F(t)^{-1} + \lambda_2 \cdot \Phi(t) \cdot \Phi(t)^T \tag{20}$$

$$\varepsilon(t+1) = \frac{y(t+1) - \hat{\Theta}(t)^T \cdot \Phi(t)}{1 + \Phi^T(t) \cdot F(t) \cdot \Phi(t)}$$

F(t) which is a 2×2 matrix in such a specific case is initialised for instance as follows:

$$F(0) = 1000 \cdot \begin{bmatrix} 1 & 0 \\ 0 & 1 \end{bmatrix}$$

In the system of equations (14), the variables $\lambda_1, \lambda_2$ are scalars and are called forgetting factors. The conditions $0 < \lambda_1 \leq 1$ and $0 \leq \lambda_2 < 2$ should be obtained. $\lambda_1$ may for instance be selected as ranging between 0.95 and 0.99 and $\lambda_2$ equal to the unit.

In such a case the criterion J minimised by the algorithm is:

$$J(t) = \sum_{i=1}^{t} \lambda_1^{(t-1)} \cdot \left(y(i) - \hat{\Theta}^T(t) \cdot \Phi(i-1)\right)^2 \tag{21}$$

Then, after the step of estimate by recursive identification of At and of ϕ, the polynomial $Rr(z^{-1})$ is calculated on line. $Rr(z^{-1})$ is determined at the means of determination 31' so that it ensures tracking of static references and that at the frequency wc the residual phase-shift and the residual attenuation are compensated for. To do so, the following system of equations must be solved, still on line:

Constraint static:

$$\frac{H(1)}{W(1)} \cdot \frac{Rr(1)}{Fr(1)} = 1 \tag{22}$$

Compensation of the residual attenuation and phase-shift at the pulse wc:

$$\frac{H(e^{-j wc Te})}{W(e^{-j wc Te})} \cdot \frac{Rr(e^{-j wc Te})}{Fr(e^{-j wc Te})} = \frac{1}{At} e^{-j \varphi} \tag{23}$$

The equation (23) being a complex equation, it is subdivided in two equations (real portion and imaginary portion). One obtains thus three equations enabling to find the three coefficients of the polynomial $Rr(z^{-1})$. The value thus calculated of $Rr(z^{-1})$ enables to adapt the transfer function of the filter 30, being understood that the denominator $Fr(z^{-1})$ may be selected freely providing it is a stable polynomial of order 3.

Advantageously, the latter embodiment authorises adaptive tracking of the frequency wc. It suffices to do so to consider the value of the frequency wc involved in the system of equations to be solved as a parameter. This parameter wc is applied at input of the determination means 31' as represented on FIG. 5. Moreover, a means to determine the frequency 50, as described above on FIG. 4, may be integrated in the latter embodiment if the frequency wc of the reference is a data external to the calculator capable of implementing the control method according to the invention.

The present description exhibits particular embodiments of devices and of processes enabling to ensure tracking of sinusoiadl references without any tracking error by a movement simulator. Although the detailed description has borne upon a movement simulator rotating around a single axis, the man of the art will understand that the invention also applies to the movement simulators having several axes around which instant rotational movements may be generated and to the translational movement simulators along one or several displacement directions.

The invention claimed is:

1. A retro-action control device of a movement simulator (10) for tracking by a simulator of a reference, said movement simulator being modelled between input formed of a control signal u(t) and output formed of a measured magnitude y(t)

comprising one of speed, position and acceleration, by a transfer function $B(z^{-1})/A(z^{-1})$, said control device comprising:
- a controller (20) synthesised from said modelling of the movement simulator, said controller comprising a reference input, a retro-action input whereon is applied said measured magnitude y(t) and an output producing a control signal u(t), the transfer function between the reference input of the controller and the measured magnitude then being $H(z^{-1})/W(z^{-1})$; further comprising: a reference filter (30) whose input is a sinusoidal reference signal c(t) at a frequency wc and applying a filtered reference signal c'(t) on the reference input of said controller 20); said reference filter having a transfer function $Rr(z^{-1})/Fr(z^{-1})$ and being adaptive,
- wherein Te is a sampling period, $$D(z^{-1}) = (1-z^{-1}) \cdot (1 - 2\cos(wc \cdot Te) \cdot z^{-1} + z^{-2}),$$

$Lo(Z^{-1})$ being a polynomial to be resolved,
$Fr(Z^{-1})$ being the denominator of the reference filter,
$W(Z^{-1})$ being the denominator of the transfer function between the reference input of the controller and the measured magnitude,
$H(Z^{-1})$ being the numerator of the transfer function between the reference input of the controller and the measured magnitude, and
wherein a numerator $Rr(z^{-1})$ of the reference filter is such as an expression $Fr(z^{-1})W(z^{-1}) - Rr(z^{-1})H(z^{-1})$ is factorised in the form:

$$D(z^{-1})Lo(z^{-1}) = [1 - 2\cos(wc \cdot Te) \cdot z^{-1} + z^{-2}]Lo(z^{-1});$$

and in that said numerator $Rr(z^{-1})$ of the transfer function between the reference input of the controller and the measured magnitude and in that said polynomial $Lo(Z^{-1})$ are a solution of a so-called Bezout equation:

$$D(z^{-1})Lo(z^{-1}) + Rr(z^{-1})H(z^{-1}) = Fr(z^{-1})W(z^{-1})$$

for the frequency wc of the reference signal, and in that the device includes a means to determine $Rr(z^{-1})$ by solving the Bezout equation according to a parameter formed by the frequency wc of said reference signal.

2. The device according to claim 1, further comprising: a means for estimating a pulse by determining a value of the pulse of the reference applied at input of said reference filter.

3. The device according to claim 2, wherein said estimating means of the pulse is based on a recursive identification algorithm comprising at least an extended least square algorithm.

4. A retro-action control device of a movement simulator (10) for tracking by a simulator of a reference, said movement simulator being modelled between input formed of a control signal u(t) and output formed of a measured magnitude y(t) comprising one of speed, position and acceleration, by a transfer function $B(z^{-1})/A(z^{-1})$, said control device comprising a controller (20) synthesised from said modelling of the movement simulator, said controller comprising a reference input, a retro-action input whereon is applied said measured magnitude y(t) and an output producing a control signal u(t), the transfer function between the reference input of the controller and the measured magnitude then being $H(z^{-1})/W(z^{-1})$; further comprising: a reference filter (30) whose input is a sinusoidal reference signal c(t) at a frequency wc and applying a filtered reference signal c'(t) on the reference input of said controller (20); said reference filter having a transfer function $Rr(z^{-1})/Fr(z^{-1})$ and being adaptive; and a means for simulating the assembly formed by the controller and by the physical system, producing an ideal measured magnitude ym(t) and having as a transfer function $H(z^{-1})/W(z^{-1})$;

a means for estimating a residual attenuation and phase-shift capable, from an actual measured magnitude y(t) and the ideal measured magnitude ym(t), to determine the values of the residual attenuation At and of the residual phase-shift φ, between the actual movement y(t) of the movement simulator and the ideal measured magnitude ym(t);

a means to determine $Rr(z^{-1})$ by calculating, at the frequency wc of the reference signal, a numerator $Rr(z^{-1})$ of the transfer function of the reference filter, in relation to the residual attenuation and phase-shift determined by said estimating means, by on-line resolution of a system of equations:

$$\frac{H(1)}{W(1)} \cdot \frac{Rr(1)}{Fr(1)} = 1$$

$$\frac{H(e^{-jwcTe})}{W(e^{-jwcTe})} \cdot \frac{Rr(e^{-jwcTe})}{Fr(e^{-jwcTe})} = \frac{1}{At} e^{-j\varphi}$$

the means to determine $Rr(z^{-1})$ taking also as an input parameter the value of the frequency of said reference signal,
wherein Te is a sampling period,
Fr being the denominator of the reference filter,
W being the denominator of the transfer function between the reference input of the controller and the measured magnitude,
H being the numerator of the transfer function between the reference input of the controller and the measured magnitude.

5. The device according to claim 4, wherein said estimating means of the residual attenuation and phase-shift is based on a recursive identification algorithm comprising at least a least square algorithm.

6. A retro-action control method comprising:
tracking via a movement simulator by a simulator of a reference, said movement simulator being modelled, between input formed of a control signal u(t) and output formed of a measured magnitude y(t) comprises a position, a speed and an acceleration, by a transfer function $B(z^{-1})/A(z^{-1})$,
controlling via a control device including a controller (20) synthesised from said modelling of the movement simulator, said controller comprising a reference input, a retro-action input whereon is applied said measured magnitude y(t) and an output producing a control signal u(t), the transfer function between the reference input of the controller and the measured magnitude then being $H(z^{-1})/W(z^{-1})$; comprising: a sinusoidal reference signal (30) having a frequency wc is filtered for applying a filtered reference signal c'(t) on the reference input of said controller (20); the filtering of the reference signal being adaptive,
wherein the filtering is provided according to a transfer function $Rr(z^{-1})/Fr(z^{-1})$,
wherein Te is a sampling period, $$D(z^{-1}) = (1-z^{-1}) \cdot (1 - 2\cos(wc \cdot Te) \cdot z^{-1} + z^{-2}),$$

$Lo(Z^{-1})$ being a polynomial to be resolved,
$Fr(Z^{-1})$ being the denominator of the reference filter, W($Z^{-1}$) being the denominator of the transfer function between the reference input of the controller and the measured magnitude, H($Z^{-1}$) being the numerator of the transfer function between the reference input of the controller and the measured magnitude, and a numerator Rr($z^{-1}$) of the reference filter is determined so that the expression Fr($z^{-1}$)W($z^{-1}$)−Rr($z^{-1}$)H($z^{-1}$) is factorised in the form:

$$D(z^{-1})Lo(z^{-1})=[1-2\cos(wc\cdot Te)\cdot z^{-1}+z^{-2}]Lo(z^{-1});$$

wherein the numerator Rr($z^{-1}$) of the transfer function between the reference input of the controller and the measured magnitude and in that said polynomial Lo($Z^{-}$) are determined as a solution of a so-called Bezout equation:

$$D(z^{-1})Lo(z^{-1})+Rr(z^{-1})H(z^{-1})=Fr(z^{-1})W(z^{-1})$$

for the frequency wc of the reference signal and in that Rr($z^{-1}$) is determined while solving said Bezout equation according to a parameter formed by the frequency wc of said reference signal.

7. The method according to claim 6, wherein:

the behaviour of the assembly formed by the controller and by the movement simulator is simulated by means of a transfer function H($z^{-1}$)/W($z^{-1}$) so as to provide an ideal measured magnitude ym(t);

a residual attenuation At and the residual phase-shift φ between the actual movement y(t) of the movement simulator and the ideal measured magnitude ym(t) is estimated from an actual measured magnitude y(t) and the ideal measured magnitude ym(t);

said numerator Rr($z^{-1}$) is determined in relation to the frequency wc taken as a parameter, of the residual attenuation and phase-shift determined in the estimating step, by on-line resolution of a system of equations:

$$\frac{H(1)}{W(1)} \cdot \frac{Rr(1)}{Fr(1)} = 1$$

$$\frac{H(e^{-j\cdot wc\cdot Te})}{W(e^{-j\cdot wc\cdot Te})} \cdot \frac{Rr(e^{-j\cdot wc\cdot Te})}{Fr(e^{-j\cdot wc\cdot Te})} = \frac{1}{At}e^{-j\cdot\varphi}$$

the filtering of the reference is adapted with the determined value of Rr($z^{-1}$).

8. The method according to claim 7, wherein said estimating means of the residual attenuation and phase-shift is based on a recursive identification algorithm comprising at least a least square algorithm.

9. The control method according to claim 6, further comprising: an initial step for estimating a pulse of said reference signal.

10. The method according to claim 9, wherein said estimating means of a pulse is based on a recursive identification algorithm comprising at least an extended least square algorithm.

11. The method according to claim 6, wherein the method implemented by a computer program comprising a series of instructions loaded into a memory of a computer and of being executed by a calculator of said computer for generating a control signal u(t) of the movement simulator.

12. The method according to claim 7, further comprising: an initial step for estimating a pulse of said reference signal.

13. The method according to claim 8, further comprising: an initial step for estimating a pulse of said reference signal.

14. The method according to claim 7, wherein the method is implemented by a computer program comprising a series of instructions loaded into a memory of a computer and executed by a calculator of said computer generating a control signal u(t) of the movement simulator.

15. The method according to claim 8, wherein the method is implemented by a computer program comprising a series of instructions loaded into a memory of a computer and executed by a calculator of said computer generating a control signal u(t) of the movement simulator.

16. The method according to claim 9, wherein the method is implemented by a computer program comprising a series of instructions loaded into a memory of a computer and executed by a calculator of said computer generating a control signal u(t) of the movement simulator.

17. The device according to claim 4, further comprising: a means for estimating a pulse by determining a value of the pulse of the reference applied at input of said reference filter.

18. The device according to claim 17, wherein said estimating means of the pulse is based on a recursive identification algorithm comprising at least an extended least square algorithm.

* * * * *